(12) United States Patent
Nadimpalli et al.

(10) Patent No.: US 12,509,354 B2
(45) Date of Patent: Dec. 30, 2025

(54) METHOD FOR ENHANCING THROUGHPUT AND YIELD IN NANOPARTICLE PRODUCTION

(71) Applicant: Tata Consultancy Services Limited, Mumbai (IN)

(72) Inventors: Naga Ravikumar Varma Nadimpalli, Pune (IN); Kshitij Saxena, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1123 days.

(21) Appl. No.: 17/493,143

(22) Filed: Oct. 4, 2021

(65) Prior Publication Data

US 2022/0220000 A1 Jul. 14, 2022

(30) Foreign Application Priority Data

Dec. 15, 2020 (IN) .............................. 202021054473

(51) Int. Cl.
*C01F 17/235* (2020.01)
*B82Y 30/00* (2011.01)
*B82Y 40/00* (2011.01)

(52) U.S. Cl.
CPC .............. *C01F 17/235* (2020.01); *B82Y 30/00* (2013.01); *B82Y 40/00* (2013.01);
(Continued)

(58) Field of Classification Search
CPC .............. C01P 2004/84; C01P 2004/88; C01P 2004/62; C01P 2004/64; C01P 2004/04;
(Continued)

(56) References Cited

U.S. PATENT DOCUMENTS

| 9,855,549 B2 | 1/2018 | Gao et al. |
| 2017/0298252 A1* | 10/2017 | Arnepalli ............. C09K 3/1436 |
| 2019/0175536 A1 | 6/2019 | Joo et al. |

FOREIGN PATENT DOCUMENTS

WO WO-03089374 A1 * 10/2003 ............. B82Y 30/00

OTHER PUBLICATIONS

Curtis Williamson et al., "The prodigious effects of concentration intensification on nanoparticle synthesis: a high-quality, scalable approach," Journal of the American Chemical Society, Nov. 2015, JACS, https://www.researchgate.net/publication/284434017_The_prodigious_effects_of_concentration_intensification_on_nanoparticle_synthesis_a_high-quality_scalable_approach/link/5c049fe6299bf1a3c15e41bc/download.
(Continued)

*Primary Examiner* — Smita S Patel
(74) *Attorney, Agent, or Firm* — Finnegan, Henderson, Farabow, Garrett & Dunner, LLP

(57) ABSTRACT

This disclosure relates to solvothermal synthesis-based method for nanoparticles production. In conventional methods, precursor loading is limited to below the solubility limit of the precursor and results in low throughput and low yield. The disclosed method increases metal precursor loading up to the solubility limit of the metal precursor solution. The method includes pouring the pH modifier dropwise into the metal precursor solution with vigorous stirring, resulting in formation of metal hydroxide solution. The concentration of metal precursor solution is maintained in range of 0.025 M to 2 M, pH in range of 9 to 12, and stirring speed of 800-1200 rpm. The metal hydroxide solution is heated and temperature of the reaction in the range of 25° C. to 400° C. is maintained with aging time in the range of 6 to 24 hours to obtain the nanoparticle slurry resulting production of high yield and high throughput nanoparticles.

6 Claims, 7 Drawing Sheets

(52) U.S. Cl.
CPC ...... *C01P 2004/03* (2013.01); *C01P 2004/51* (2013.01); *C01P 2004/64* (2013.01)

(58) Field of Classification Search
CPC .... C01P 2004/52; C01F 17/235; B82Y 30/00; B82Y 40/00
See application file for complete search history.

(56) References Cited

OTHER PUBLICATIONS

Hong Zhao et al., "Effects of pressure and precursor loading in the flame synthesis of titania nanoparticles," Journal of Aerosol Science, Nov. 2009, vol. 40, Issue 11, pp. 919-937, Elesvier, http://coewww.rutgers.edu/~sdytse/papers/2009-JAS-titania.pdf.

Ahmed Fattah Abdulrahman et al., "Enhancement of ZnO Nanorods Properties Using Modified Chemical Bath Deposition Method: Effect of Precursor Concentration," Crystals, May 2020, vol. 10(5), MDPI, https://www.researchgate.net/publication/341281942_Enhancement_of_ZnO_Nanorods_Properties_Using_Modified_Chemical_Bath_Deposition_Method_Effect_of_Precursor_Concentration/link/5eb9fff292851cd50dab4ec3/download.

Yonggang Yao et al., "High-throughput, combinatorial synthesis of multimetallic nanoclusters", Materials Science, Medicine, Mar. 2020, vol. 117(12), pp. 6316-6322, PNAS, https://www.pnas.org/content/pnas/117/12/6316.full.pdf.

Siti Machmudah et al., "Synthesis of ZrO2 Nanoparticles by Hydrothermal Treatment," AIP Conference Proceedings, Feb. 2015, AIP, https://aip.scitation.org/doi/pdf/10.1063/1.4866753#:~:text=In%20this%20research%2C%20hydrothermal%20synthesize,porous%20particles%20was%20also%20investigated.

Vasiliki Tsikourkitoudi et al, "Flame-Made Calcium Phosphate Nanoparticles with High Drug Loading for Delivery of Biologics," Molecules, Apr. 2020, vol. 25(7), MDPI, https://pdfs.semanticscholar.org/897d/9a8f437117b97812032ad86cd31c07036bbb.pdf?_ga=2.213563287.2051707734.1626948412-1635883128.1626151822.

\* cited by examiner

```
┌─────────────────────────────────────────────────┐
│ DETERMINE A METAL PRECURSOR LOADING BASED ON A  │
│ TARGET PRODUCTION RATE OF THE NANOPARTICLES,    │
│ TARGET NANOPARTICLE PROPERTIES FOR THE APPLICATION, │
│ AND A PLURALITY OF SOLUBILITY PLOTS OF A METAL  │
│ PRECURSOR SOLUTION, WHEREIN THE PLURALITY OF    │
│ SOLUBILITY PLOTS ARE DEPENDENT ON PROCESS       │──102
│ CONDITIONS OF A REACTION FOR PRODUCTION OF      │
│ NANOPARTICLES, AND WHEREIN THE PROCESS CONDITIONS │
│ COMPRISES TEMPERATURE, PRESSURE, PH, AGING TIME AND │
│ STIRRING SPEED OF A REACTION MIXTURE DURING THE │
│ REACTION, AND WHEREIN THE METAL PRECURSOR LOADING │
│ IS IN A RANGE CLOSE TO A SOLUBILITY LIMIT OF THE │
│ METAL PRECURSOR LOADING                         │
└─────────────────────────────────────────────────┘
                        ↓
┌─────────────────────────────────────────────────┐
│ DETERMINE VISCOSITY AND DENSITY OF THE REACTION │──104
│ MIXTURE BASED ON THE PROCESS CONDITIONS AND THE │
│ METAL PRECURSOR LOADING                         │
└─────────────────────────────────────────────────┘
                        ↓
┌─────────────────────────────────────────────────┐
│ ESTIMATE, BASED ON THE VISCOSITY, THE DENSITY OF THE │
│ REACTION MIXTURE AND A MIXING TIME, AN OPTIMAL  │
│ STIRRING SPEED TO OBTAIN TARGET MIXING          │──106
│ CHARACTERISTICS FOR NANOPARTICLE PRODUCTION, THE │
│ MIXING TIME INDICATIVE OF TIME FOR STIRRING THE │
│ REACTION MIXTURE                                │
└─────────────────────────────────────────────────┘
                        ↓
┌─────────────────────────────────────────────────┐
│ ENABLE THE REACTION BY POURING A PH MODIFIER DROP │
│ WISE INTO THE METAL PRECURSOR SOLUTION WITH     │
│ STIRRING, RESULTING IN FORMATION OF A METAL     │
│ HYDROXIDE SOLUTION, WHEREIN THE CONCENTRATION OF │──108
│ THE METAL PRECURSOR SOLUTION MAINTAINED IN A    │
│ RANGE OF ABOUT 0.025 MOLAR TO 2 MOLAR, PH IN THE │
│ RANGE OF 9 TO 12, WHEREIN A THE SPEED OF STIRRING IS │
│ THE OPTIMAL STIRRING SPEED, AND WHEREIN THE OPTIMAL │
│ STIRRING SPEED IS IN A RANGE OF ABOUT 800 TO 1200 RPM │
└─────────────────────────────────────────────────┘
                        ↓
┌─────────────────────────────────────────────────┐
│ HEAT THE METAL HYDROXIDE SOLUTION AND           │
│ MAINTAINING A TEMPERATURE OF THE REACTION IN THE │
│ RANGE OF 25OC TO 400OC AT A SATURATION PRESSURE │──110
│ CORRESPONDING TO THE TEMPERATURE WHEREIN AGING  │
│ TIME IN THE RANGE OF 6 TO 24 HOURS TO OBTAIN    │
│ NANOPARTICLE SLURRY COMPRISING THE NANOPARTICLES │
└─────────────────────────────────────────────────┘
```

FIG. 1    ← 100

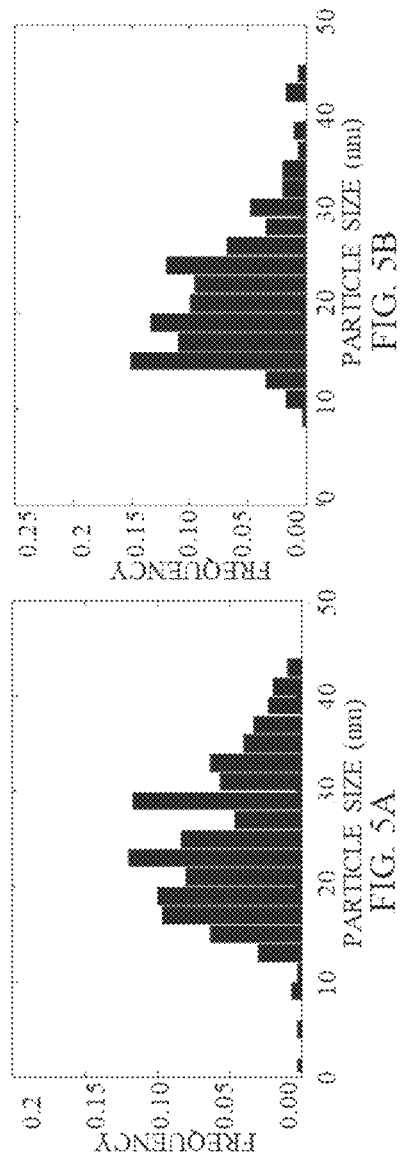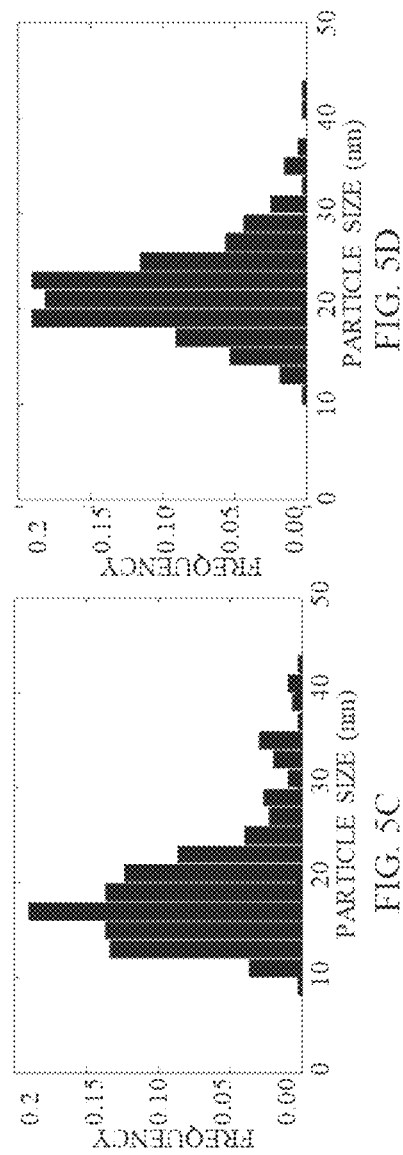

METHOD FOR ENHANCING THROUGHPUT AND YIELD IN NANOPARTICLE PRODUCTION

PRIORITY CLAIM

This U.S. patent application claims priority under 35 U.S.C. § 119 to: India Application No. 202021054473, filed on Dec. 15, 2020. The entire contents of the aforementioned application are incorporated herein by reference.

TECHNICAL FIELD

This disclosure relates generally to nanoparticles production, and more particularly to method for production of high throughput and high yield nanoparticles using solvothermal process.

BACKGROUND

The use of nanoparticles for various commercial applications have been gaining great attention in recent decades, which has already exceeded 10 million tons in capacity with above 2 trillion USD global market. The important features of nanoparticles including unique physicochemical properties such as chemical, optical, electrical, magnetic, which are responsible for diverse applications of nanoparticles. These applications can be exploited to make them suitable for many potential applications such as pigments, catalysts, UV-stabilizing agents, chemical mechanical planarization (CMP) abrasives, and photo-catalysts, and so on.

The high throughput and high yield along with a tight control of particle size, shape, and crystallinity are the common demands in nanoparticle production. Various technologies for nanoparticles production are continuously being explored to achieve high throughput and high yield nanoparticles. The majority of the methods have been developed to optimize the process conditions in terms of temperature, pressure, stirring speed, flow rates of the reactants and so on. In conventional solvothermal processes, the precursor loading is limited to well below the saturation limit (several orders lesser than the solubility limit) of the precursor and focused completely on the tight control of the particle size and size distribution, by varying temperature, pressure, pH, and stirring speed and aging time etc., which results in low throughput and low yield. The major challenge in high throughput nanoparticle production is not only controlling particle properties (size, shape, and crystallinity) but also achieving reproducibility. As throughput of precursor increases (precursor loading), the physicochemical properties (density, viscosity, heat capacity, and thermal conductivity of reaction mixture and particle slurry) significantly change, resulting in completely different particle growth processes compared to low precursor loading. Thus, particle properties are difficult to control at high throughput. The key demand for high throughput nanoparticle synthesis is to provide efficient and rapid mixing, by manipulating the stirring speed, which facilitates rapid chemical reactions and therefore efficient control and reproducibility of nanoparticles properties.

SUMMARY

Embodiments of the present disclosure present technological improvements as solutions to one or more of the above-mentioned technical problems recognized by the inventors in conventional systems. For example, in one embodiment, a a solvothermal synthesis-based method for production of nanoparticles at high throughput with high yield is disclosed. The method includes determining a metal precursor loading based on a target production rate of the nanoparticles for the application, target nanoparticle properties for the application, and a plurality of solubility plots of a metal precursor solution, wherein the plurality of solubility plots are dependent on process conditions of a reaction for production of nanoparticles, and wherein the process conditions comprises temperature, pressure, pH, aging time and stirring speed of a reaction mixture during the reaction, and wherein the metal precursor loading is up to a solubility limit of the metal precursor loading. Further, the method includes determining viscosity and density of the reaction mixture based on the process conditions and the metal precursor loading. Furthermore, the method includes estimating, based on the viscosity, the density of the reaction mixture and a mixing time, an optimal stirring speed to obtain target mixing characteristics for nanoparticle production, the mixing time indicative of time for stirring the reaction mixture. Also, the method includes enabling the reaction by pouring a pH modifier drop wise into the metal precursor solution with stirring, resulting in formation of a metal hydroxide solution, wherein the concentration of the metal precursor solution maintained in a range of about 0.025 Molar to 2 Molar, pH in the range of 9 to 12, wherein the speed of stirring is the optimal stirring speed, and wherein the optimal stirring speed is in a range of about 800 to 1200 rpm. Moreover, the method includes heating the metal hydroxide solution and maintaining a temperature of the reaction in the range of 25° C. to 400° C. at a saturation pressure corresponding to the temperature wherein aging time in the range of 6 to 24 hours to obtain nanoparticle slurry comprising the nanoparticles.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a flow-diagram of a method for enhancing throughput and yield in nanoparticle production, in accordance with an example embodiment.

FIG. 5A illustrates effect of precursor concentration on particle size distribution (PSD) of ceria nanoparticle produced using batch solvothermal reactor at T=200° C., stirring speed, N=1200 rpm after 24 hours of solvothermal treatment: 0.025 M (PSD plot was generated by analyzing 300 particles using at least six different SEM images obtained from three independent experiments), respectively, in accordance with an example embodiment.

FIG. 5B illustrates effect of precursor concentration on particle size distribution (PSD) of ceria nanoparticle produced using batch solvothermal reactor at T=200° C., stirring speed, N=1200 rpm after 24 hours of solvothermal treatment: 0.05 M (PSD plot was generated by analyzing 300 particles using at least six different SEM images obtained from three independent experiments), respectively, in accordance with an example embodiment.

FIG. 5C illustrates effect of precursor concentration on particle size distribution (PSD) of ceria nanoparticle produced using batch solvothermal reactor at T=200° C., stirring speed, N=1200 rpm after 24 hours of solvothermal treatment: 0.075 M (PSD plot was generated by analyzing 300 particles using at least six different SEM images obtained from three independent experiments), respectively, in accordance with an example embodiment.

FIG. 5D illustrates effect of precursor concentration on particle size distribution (PSD) of ceria nanoparticle produced using batch solvothermal reactor at T=200° C., stirring speed, N=1200 rpm after 24 hours of solvothermal treatment: 0.5 M (PSD plot was generated by analyzing 300 particles using at least six different SEM images obtained from three independent experiments), respectively, in accordance with an example embodiment.

DETAILED DESCRIPTION

Figure 2:
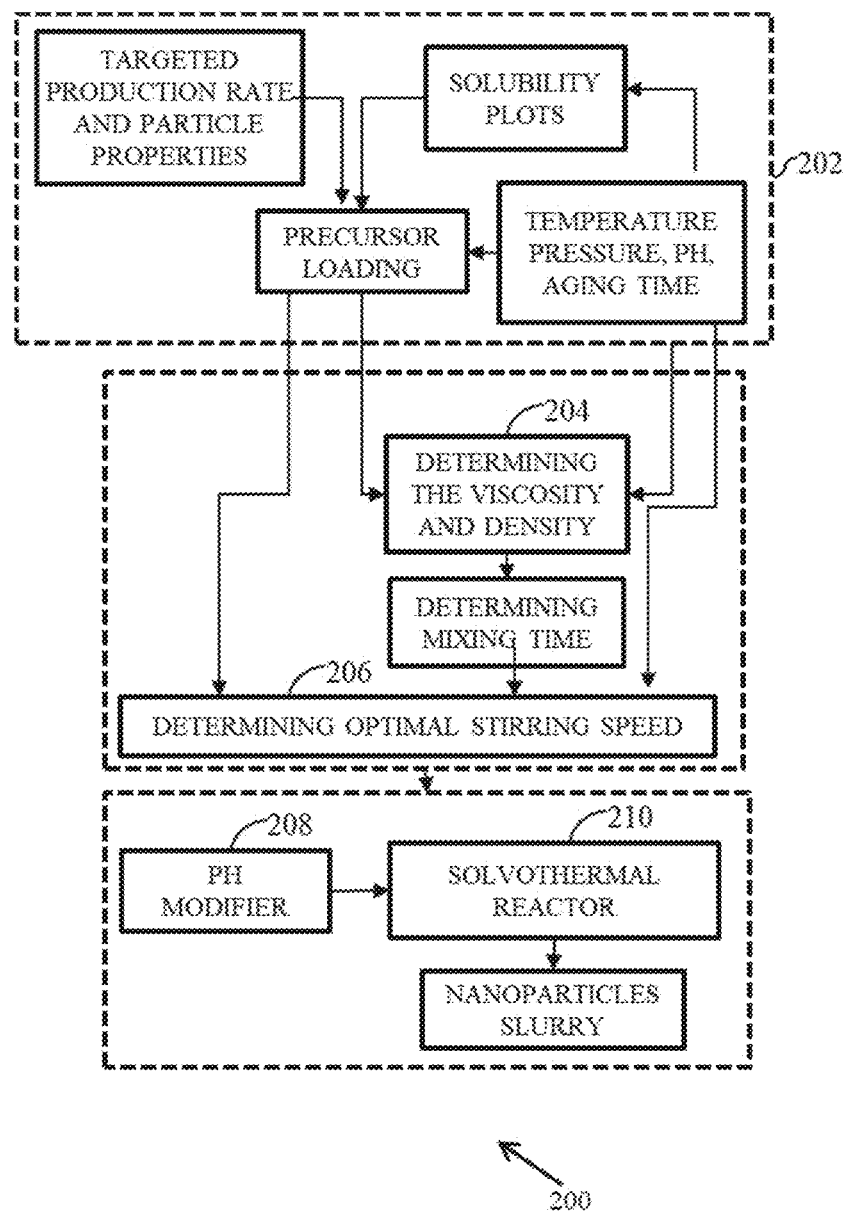
FIG. 2 illustrates an example process flow of the method of FIG. 1 in accordance with an example embodiment.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

For nanoparticle production, some of the critical demands are high-throughput and high-yield along with a tight control of particle size. In conventional solvothermal processes, the precursor loading (i.e., amount of precursor added in the synthesis), is limited to well below the saturation limit (several orders lesser than the solubility limit) of the precursor and focused completely on the tight control of the particle size and size distribution that results in low throughput and low yield. For example, the solubility of a precursor, namely, Cerium (III) nitrate hexahydrate ($Ce(NO_3)_3 \cdot 6H_2O$) in water at ambient conditions is 5.232 mol/kg or 2.154 M, which means that 2271.7344 gm of $Ce(NO_3)_3 \cdot 6H_2O$ can be dissolved in 1 L of water at room temperature. However, the typical precursor loadings in the conventional solvothermal synthesis of ceria nanoparticles is order of 1 mM [2.3 g of $Ce(NO_3)_3 \cdot 6H_2O$ in 1 L of water]. Since, large scale production of nanoparticles require maximum possible yield with better controlled particle size, the conventional methods of nanoparticle production are ineffective in providing requisite yields of nanoparticles.

A known method utilizes heating near the solubility limit of the precursors for the production of metal sulfides nanoparticles. However, said method is not related to solvothermal synthesis and it has not highlighted the methodology to employ suitable operating conditions for different precursor loadings. The said method does not highlight manipulating the process variables in line with the precursor loading to control and optimize the nanoparticle properties. As precursor loading increases, the physical and transport properties of particle slurry significantly change, which requires the suitable operating conditions to control the nanoparticle growth. For example, viscosity and density of nanoparticle slurry increases and particle diffusion coefficient decreases as precursor loading increases. Therefore, a suitable temperature, pressure, pH, aging time and stirring speed needs to be employed to favor the suitable nanoparticle growth. The disclosed embodiments facilitates in not only increasing the precursor loading to produce the high throughput and high yield nanoparticles but also employs the suitable process conditions (temperature, pressure, pH, stirring speed and so on) to control the particle growth and therefore particle size, size distribution and crystallinity and so on.

Most of the conventional methods are aimed at improving nanoparticle production and other properties of nanoparticles. However, improving throughput and yield of nanoparticles and controlling the process conditions for high precursor loading have received a limited attention. Moreover, the process regime (precursor loading and the corresponding process conditions) considered for such studies were very narrow and not explored to the feasible regime.

Various embodiments have been disclosed for a method for high-throughput and high-yield nanoparticles along with a tight control of particle size. For example, in an embodiment, a method for nanoparticle production utilizes enhanced precursor loading along with a suitable operating conditions (temperature, pressure, pH, aging time, stirring speed and so on) for enhancing the throughput and yield of nanoparticle production. The nanoparticle production by utilizing the disclosed method is several orders of magnitudes higher than those obtained by conventional precursor loadings. The high precursor loading leads to the inhomogeneity in the distribution of reactants and products inside a solvothermal reactor.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 7B, where similar reference characters denote corresponding features consistently throughout the figures, there are shown preferred embodiments and these embodiments are described in the context of the following exemplary system and/or method.

Referring collectively to FIGS. 1 and 2, the method for production of nanoparticles at high throughput and high yield are illustrated. For example, FIG. 1 illustrates a flow-diagram 100 of a method for production of nanoparticles at high throughput and high yield, in accordance with an example embodiment. FIG. 2 illustrates a process flow diagram 200 of the method for production of nanoparticles at high throughput and high yield, in accordance with an example embodiment. Herein, the disclosed method facilitates in production of nanoparticles at high throughput and high yield with the similar particle properties (particle size, size distribution and crystallinity) irrespective of precursor loading (throughput). As will be understood, herein the term 'throughput' refers to raw material or precursor loading. Also, the term 'yield' refers to the amount of product formed from the raw material through chemical reaction.

In an embodiment, the disclosed method includes determining the maximum possible precursor loading based on the targeted production rates and particle properties, solubility of metal precursor and feasible process conditions (temperature, pressure, stirring speed, pH, and aging time and so on). Herein, the precursor loading ranges from 0.025 M to 2 M, pH in the range of 9 to 12, wherein a speed of stirring is about 800 to 1200 rpm. Further, the method includes heating the reaction mixture and maintaining a temperature of the reaction in the range of 25° C. to 400° C. at a corresponding saturation pressure wherein aging time is in the range of 6 to 24 hours to obtain nanoparticle slurry comprising the nanoparticles.

The required particle properties can be obtained by manipulation of process conditions such as temperature, pressure, pH, aging time, stirring speed and so on. Here, the reaction kinetics, particle formation and growth are controlled by employing a suitable process conditions. For example, as precursor loading increases from 0.025 Molar to 0.1 Molar, it requires to employ a higher temperature (up to 300° C.) and stirring speed (up to 1200 rpm) to obtain the similar nanoparticle properties obtained at the lower precursor loadings and lower temperature (200° C.).

Enhanced throughput and yield of nanoparticle synthesis/production for an application involves increasing the precursor loading (high throughput) up to solubility limit of the precursor. For example, the solubility limit of cerium nitrate is 2.154 M. However, the precursor loading in most of the practical synthesis conditions are typically of 0.025 M owning to the uncontrolled particle formation and growth at high precursor loadings. Thus, there is a scope of increasing the precursor loading up to 100 times while maintaining the suitable process conditions to produce the required particle properties. Also, as precursor loading (throughput) increases, the particle size grows bigger due to rapid nucleation and particle growth rates owing to the availability of more product molecules. The method 100, 200 for enhanced throughput and yield of nanoparticles production is described further with reference to 102-110 (in FIG. 1)/202-210 (FIG. 2).

At 102, the method 100 (or at 202 of method 200) includes determining a metal precursor loading based on a target production rate of the nanoparticles of the application, target nanoparticle properties for the application, and a plurality of solubility plots of a metal precursor solution.

The plurality of solubility plots are dependent on process conditions of a reaction for production of nanoparticles. The process conditions includes temperature, pressure, pH, aging time and stirring speed of a reaction mixture during the reaction. An important contribution of the disclosed embodiments is that the metal precursor loading is in a range close to a solubility limit of the metal precursor loading. In an embodiment, the metal precursor loading may be gradually increased/enhanced in a solvothermal reactor (for example, a solvothermal reactor 300 described below with reference to FIG. 3) and The data acquisition system is installed to continuously record the data from the reactor for monitoring and control purposes.

Enhanced precursor loading involves determining the maximum possible precursor loading, closer to the solubility limit, based on the targeted production rates and particle properties, solubility of metal precursor and feasible process conditions (temperature, pressure, stirring speed, pH, and aging time and so on).

The process conditions enabled by the solvothermal reactor are characterized in increasing metal precursor loading up to solubility limit of a metal precursor solution in a solvent and accordingly employing the suitable values of other process conditions such as temperature, pressure, pH, aging time, stirring speed and so on. In various embodiments, examples of the metal precursor solution may include but are not limited to, titanium tetrachloride, silicon tetrachloride, aluminum nitrate, cerium nitrate, and zirconium nitrate. The solvents may include but are not limited to water, carbon dioxide, ethanol, and methanol.

The viscosity and the density of the reaction mixture is determined based on the process conditions and the metal precursor loading. Initially, viscosity and density of the reaction mixture is determined based on precursor loading and other process conditions such as temperature, pressure, pH, aging time and so on at 104 (FIG. 1)/204 (FIG. 2). Then, said values of the viscosity and the density are utilized in addition to a mixing time to estimate an optimal/suitable stirring speed to obtain the target mixing characteristics for nanoparticle production at 106 (FIG. 1)/206 (FIG. 2). Herein, the mixing time is indicative of time for stirring the reaction mixture. The higher precursor loadings significantly affect the physical, transport and thermal properties of the precursor solution. Density and viscosity of the precursor solution increase, whereas ionic conductivity decreases as precursor loading increases. For example, viscosity of the reaction mixture increases by nearly 8 times when precursor loading increases from 0.05 M to 0.5 M. Therefore, these modified properties adversely affect the mixing characteristics. Thus, viscosity of the reaction mixture not only determines the stirring speed for mixing but also type of the impeller to be used.

The mixing in stirred tank based solvothermal reactors are typically driven by turbulence, which can be described in three different physical processes: distribution, dispersion, and diffusion. The distribution is the slowest step in turbulence; however, it can become rapid by employing a suitable rotational speed (stirring speed). The scale of turbulence is typically characterized by the Kolmogorov scale of mixing, which can defined as:

$$\eta = \left(\frac{v^3}{\varepsilon}\right)^{1/4},$$

where υ and ε are kinematic viscosity and turbulence kinetic energy dissipation rate per unit mass.

The mixing time is an important parameter to characterize the turbulence mixing for different viscosity and stirring speed values, based on which, it is possible to estimate the suitable stirring speed for a given precursor loading. Here, mixing time refers to the time required to obtain the required degree of mixing. The empirical relationship for the Rushton turbine impeller for mixing time and stirring speed (dimensionless number) as a function of Reynolds number is given as:

$$N_i t_m = \frac{1.54\, V}{D_i^3} \quad \text{for } Re_i > 5 \times 10^3 \tag{1}$$

$$Re_i = \frac{N_i D_i^2 \rho}{\mu} \tag{2}$$

where, $N_i$ is rotational or stirring speed, $t_m$ is mixing time, $Re_i$ is impeller Reynolds number, $\mu$ is viscosity of reaction mixture, $\rho$ is density of reaction mixture, and $D_i$ is diameter of an impeller. By using equations (1) and (2), it is possible to estimate the stirring speed for a given precursor loading.

Herein, it will be understood that Rushton turbine impeller is provided only as an example of the impeller for describing the disclosed embodiments. However, in various other embodiments, the relationship between the mixing time and the stirring speed may be derived/obtained to compute an optimal stirring speed of mixing for different types of impellers without restricting to the aforementioned example.

At 108 (FIG. 1)/208 (FIG. 2), the reaction is enabled by pouring a pH modifier dropwise into a metal precursor solution with vigorous stirring, resulting in formation of a metal hydroxide solution. Herein, the concentration of the metal precursor solution is maintained in a range of about 0.025 Molar to 2 Molar, and the pH in the range of 9 to 12. The reaction mixture is stirred at the optimal speed which is in a range of around. 800 to 1200 rpm. At 110 (FIG. 1)/210 (FIG. 2), the method includes heating the metal hydroxide solution and maintaining a temperature of the solvothermal reactor in the range of 25° C. to 400° C. to obtain nanoparticle slurry consisting of the nanoparticles. The solvothermal reactor is quickly quenched to room temperature after completion of the reaction. The nanoparticle slurry is cleaned with double distilled water and ethanol simultaneously for a plurality of times to remove impurities, unreacted ions and precursor and obtain cleaned samples. The cleaned samples may be centrifuged to separate the nanoparticles from the nanoparticle slurry. Further, the cleaned samples are oven dried to obtain a dry ceria powder.

Figure 3:
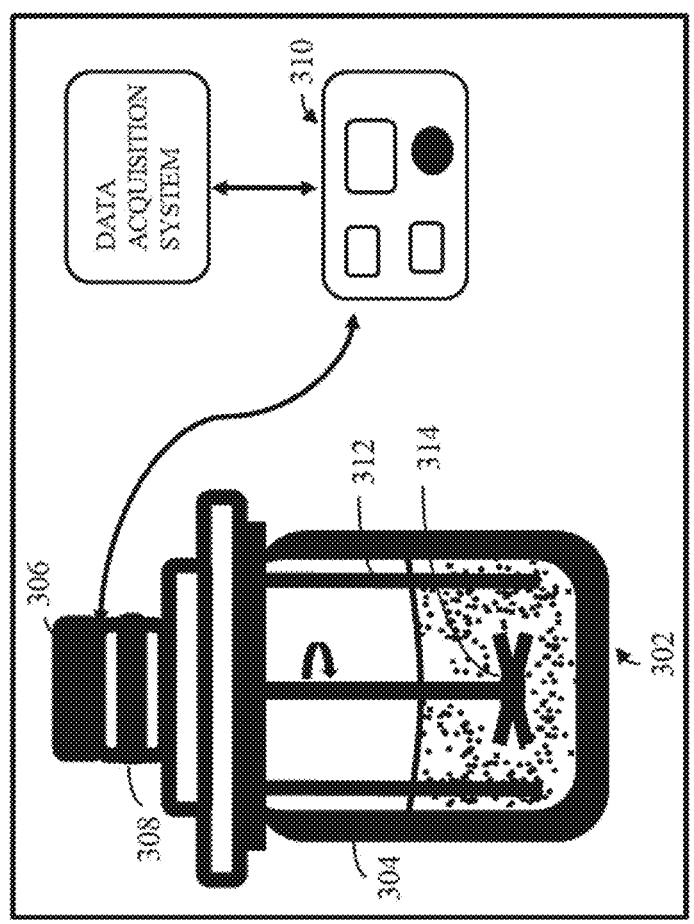
FIG. 3 is a solvothermal reactor for enhancing throughput and yield in nanoparticles, in accordance with an example embodiment.
Figure 4B:
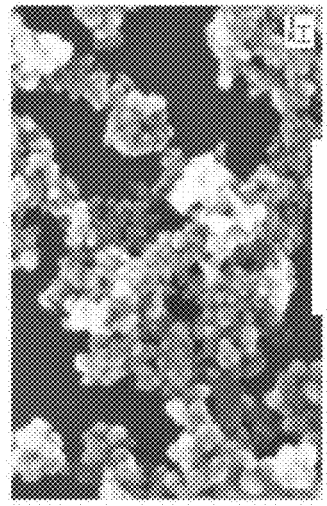
FIG. 4B illustrates an SEM image of ceria nanoparticles produced after 24 hours of hydrothermal treatment at different precursor concentrations of 0.05 M.
Figure 4D:
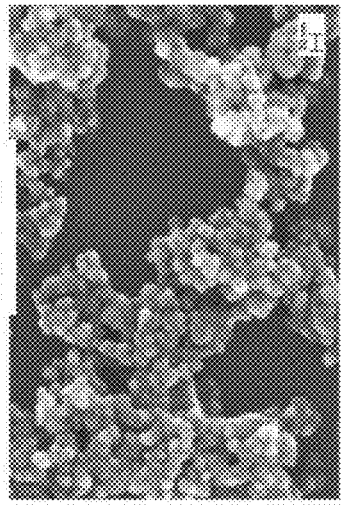
FIG. 4D illustrates an SEM image of ceria nanoparticles produced after 24 hours of hydrothermal treatment at different precursor concentrations of 0.5 M.
Figure 4A:
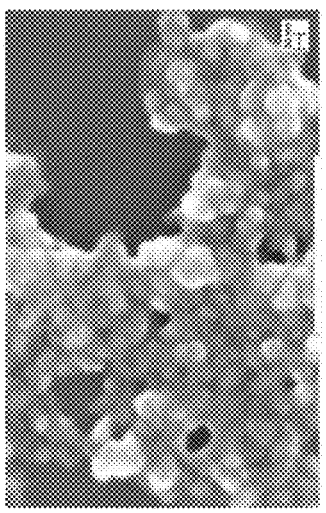
FIG. 4A illustrates an SEM image of ceria nanoparticles produced after 24 hours of hydrothermal treatment at different precursor concentrations of 0.025 M
Figure 4C:
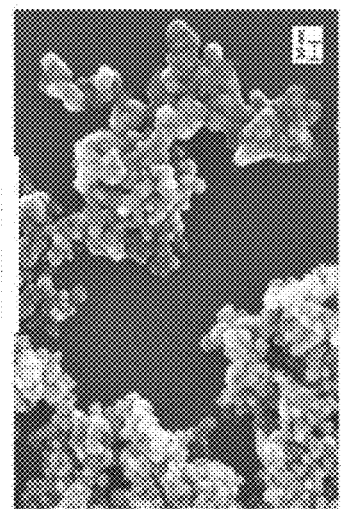
FIG. 4C illustrates an SEM image of ceria nanoparticles produced after 24 hours of hydrothermal treatment at different precursor concentrations of 0.075 M.

An example of the solvothermal reactor is described further with reference to FIG. 3.

FIG. 3 illustrates a solvothermal reactor 300 for production of nanoparticles, in accordance with an example embodiment. The solvothermal reactor 300 (hereinafter referred to as a 'reactor') is configured to facilitate the production of high throughput and high yield nanoparticles from a high precursor loading by enabling process conditions manipulating the reaction kinetics, particle formation and growth. The reactor 300 includes an autoclave solvothermal reactor 302, an electric heater 304, a solvothermal rotor attached with a motor 306 through a magnetic drive 308, and a control panel 310. The reactor 300 consists of various internal components such as a thermal well for thermocouple, a sample tube to collect the sample, and cooling tubes such as tubes 312, and an impeller 314. The cooling tubes serve to not only control the reactor set temperature but also quench the reactor instantaneously after the reaction is complete. The thermocouple is sealed in the thermal well. In an example scenario, the reactor, internals, and all wetted parts may be made of Hastelloy-C, whereas all the external components, tubing and fittings may be made of stainless steel (SS316). Hastelloy-C is more corrosive resistant as compared to SS316. In an example scenario, the reactor may have following specification: an inner diameter of around 65 mm and length of around 76.8 mm with the net volume of 250 ml; the inner diameters of the reactor cooling tubes, thermal well, and sample tube are 5, 7, and 6 mm, respectively; the agitator consists of a four bladed 45o pitched turbine impeller (PTB), which is made of Hastelloy-C; and the diameters of impeller and impeller tubes are 30 and 6 mm, respectively.

An example of enhancing throughput and yield during nanoparticles production is described further with reference to FIGS. 4-7B below.

Example Scenario:

In an example scenario, Cerium (III) nitrate hexahydrate (Ce(NO3)3.6H2O, REacton®) with 99.5% purity and sodium hydroxide (NaOH) pellets were used without any further purification. Double distilled (DD) water has been used as a solvent.

Initially, cerium (III) nitrate solution and sodium hydroxide solutions were prepared separately by adding the known quantities of respective salts in a solvent such as DD water. Then the sodium hydroxide solution was poured into cerium nitrate solution in a drop-wise manner with vigorous stirring, resulting in the light brown colour precipitate (Ce(OH)3), which subsequently turns out into purple colour, representing the formation of Ce(OH)4. The solution was then placed in an autoclave reactor of the reactor 200, which was subjected to heating to maintain the reactor set temperature. Here, the pressure is indigenously generated inside the reactor, depending on the reactor temperature—pressure is not controlled independently. The reactor was quickly quenched to room temperature after completion of the experiment. The reaction was carried out for 24 hours and the samples were collected in the form of nanoparticle slurry (light yellow in color) at definite time intervals for the characterization. The formation of ceria from cerium nitrate can be represented using the below chemical reaction.

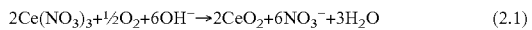

$$2Ce(NO_3)_3 + \tfrac{1}{2}O_2 + 6OH^- \rightarrow 2CeO_2 + 6NO_3^- + 3H_2O \tag{2.1}$$

The samples collected from the reactor were cleaned with DD water and ethanol simultaneously for several times to remove the impurities, unreacted ions and precursor and then centrifuged to separate the particles. They were then oven dried to obtain the dry ceria powder.

The residue solution after separating the particles was analyzed using Ultraviolet-Visible Spectroscopy (UV-Vis spectroscopy) for detecting the unreacted Ce(NO3)3 precursor concentration, then determining the reaction kinetics. The dry product particles were analyzed using the X-ray Diffraction (XRD) for identifying the phase and crystallinity of the product particles. The dry particles were dispersed in ethanol using ultrasonic bath and drop-casted on a silicon wafer and carbon-coated copper grids, which were oven dried for 24 hours. They were then analysed using scanning electron microscopy (SEM) and transmission electron microscopy (TEM) to determine the particle size and morphology.

In an example scenario, to obtain the high throughput and high yield nanoparticles, different set of experiments are performed at different process conditions namely, precursor concentration, reactor temperature, pressure, pH, stirring speed, and aging times. The temperature of the reactor was varied from 25 to 400° C., accounting for the subcritical and near critical conditions. The stirring speeds were varied from 800 rpm to 1200 rpm, covering the laminar-turbulent transition regime to fully developed turbulent regime. A wide range of precursor ($Ce(NO_3)_3 \cdot 6H_2O$) concentrations was employed ranging from 0.025 to 2 M, ranging from dilute to concentrated systems. The aging time varied from 6 hours to 24 hours for all the experiments. The yield of nanoparticles with high precursor loading ranges from 98 to 363 gm, whereas it is typically 0.368 to 2 gm in conventional precursor loadings.

The SEM images of ceria nanoparticles produced at different precursor loadings are shown in FIGS. 4A-4D. Particularly, FIGS. 4A-4D shows SEM images of ceria nanoparticles produced at different precursor loadings, namely (a) 0.025 M (b) 0.05 M (c) 0.075 M (d) 0.5 M, respectively. The spherical morphology can be observed at all the precursor loadings.

Further, the PSD plots (FIGS. 5A-5D) reveal that the PSD is broader at low precursor loading and it becomes narrower as precursor loading increases. Particularly, FIGS. 5A-5D illustrates effect of precursor concentration on particle size distribution (PSD) of ceria nanoparticle produced using batch solvothermal reactor at T=200° C., stirring speed, N=1200 rpm after 24 hours of solvothermal treatment: (a) 0.025 M (b) 0.05 M (c) 0.075 M (d) 0.5 M (each PSD plot was generated by analysing 300 particles using at least six different SEM images obtained from three independent experiments), respectively.

Figure 6A:
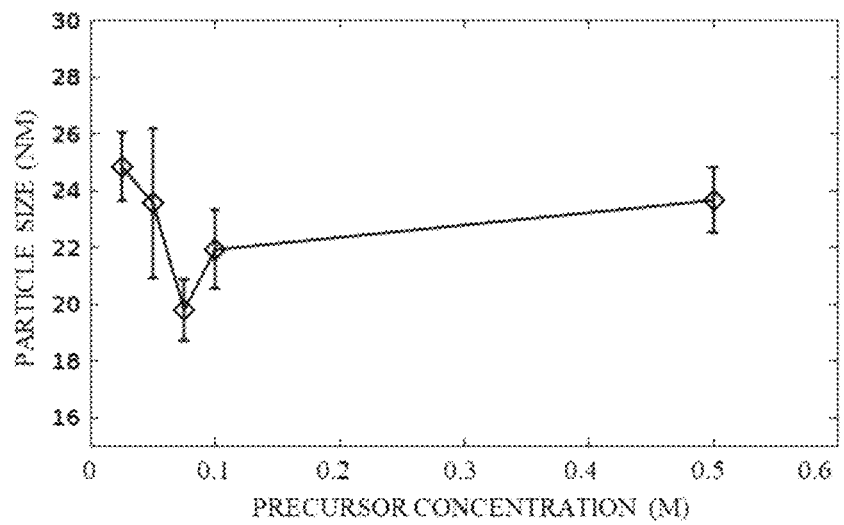
FIG. 6A illustrate ceria mean particle size along with standard deviation at different precursor concentrations produced using batch solvothermal reactor at T=200° C. and stirring speed, N=1200 rpm after solvothermal treatment of 24 h, in accordance with an example embodiment.
Figure 6B:
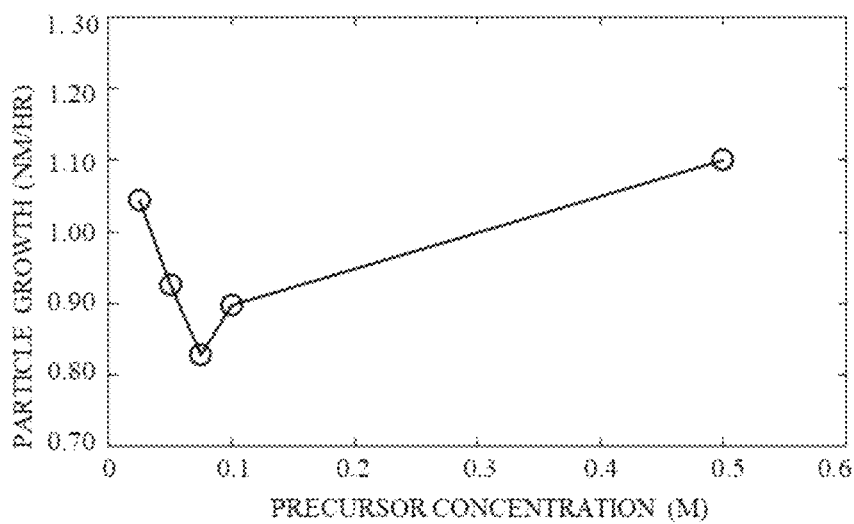
FIG. 6B illustrate particle growth rate at different precursor concentrations produced using batch solvothermal reactor at T=200° C. and stirring speed, N=1200 rpm after solvothermal treatment of 24 h, in accordance with an example embodiment.

FIGS. 6A-6B illustrates the evolution of mean particle size and standard deviation of the PSD at different precursor loadings after 24 hours of solvothermal treatment. The mean particle size initially decreases with increase in precursor concentration and increases upon reaching the threshold concentration (0.075 M). As precursor concentration increases, the product monomer concentration increases resulting in the enhanced nucleation rates. However, the particle growth rates decrease [FIGS. 6A-6B] as precursor concentration increases up to 0.075 M.

The higher precursor loadings significantly affect the physical, transport and thermal properties of the precursor solution. Density and viscosity of the precursor solution increases, whereas ionic conductivity decreases as precursor loading increases. Therefore, these modified properties adversely affects the particle growth. For example, diffusional growth rate of particles decreased by two orders of magnitude because of increase in viscosity by two orders at the precursor loading of 0.075 M. Thus the mean particle size decreases with sharp PSD as precursor loading increases from 0.025 to 0.075 M. However, further increase in precursor loading (>0.075 M) not only increases the mean particle size but also narrows PSD due to enhanced growth rate of the particles [FIG. 6A-6B], owing to the significant increase in product monomer concentration.

Thermal properties such as heat capacity and thermal conductivity significantly increases with increase in the concentration of the precursor. Higher heat capacity and thermal conductivity result in the smaller thermal diffusivity and thus the reduced thermal fluctuations in the system. Therefore, it is possible to obtain the stable thermal fields using the highly concentrated systems as compared to dilute systems. Thus, the chemical reactions and resulting particle growth in the reactor is more uniform yielding the narrow PSD at higher precursor loadings.

Figure 7A:
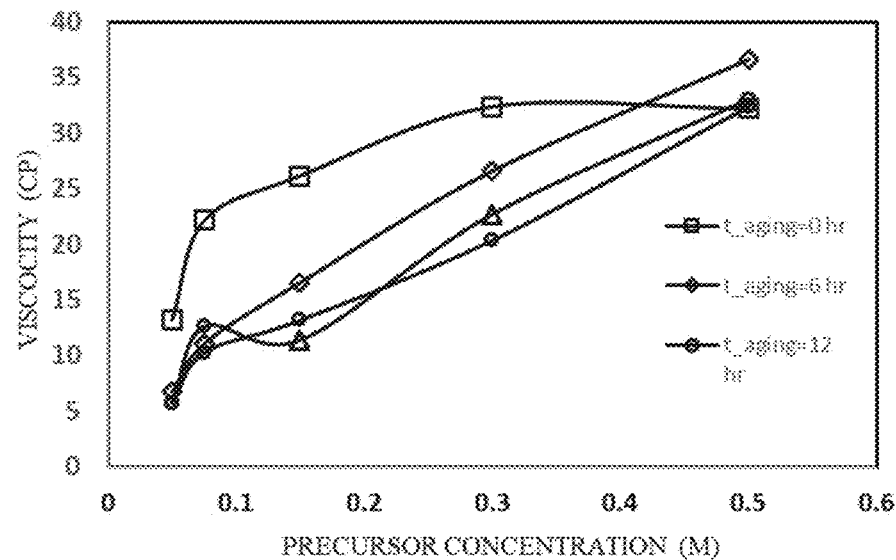
FIGS. 7A-7B illustrate viscosity of reaction mixture at different precursor loadings in accordance with embodiments of the present disclosure.
Figure 7B:
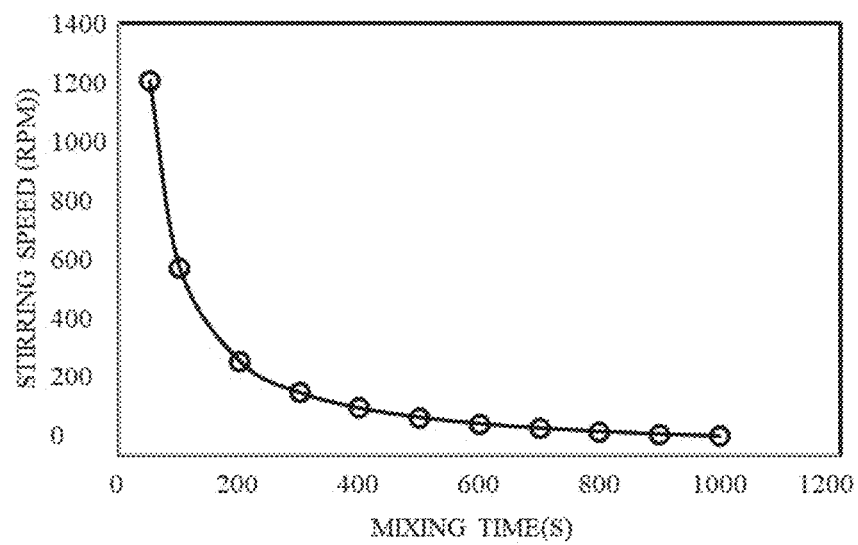

FIGS. 7A-7B illustrate viscosity of reaction mixture at different precursor loadings in accordance with embodiments of the present disclosure. Viscosity of reaction mixture steeply increases as precursor loading increases resulting in an increase in mixing time. Therefore, it is important to adjust the stirring speed according to viscosity variations in order to obtain the required mixing characteristics. The required stirring speed for different mixing times are reported in FIG. 7B. At short mixing times (for example, 50 s, corresponding to precursor loading of 0.05 M), it is required to employ the stirring speed of 1211 rpm, whereas, for longer mixing times (for example, 1000 s, corresponding to precursor loading of 0.5 M), it is required to employ the stirring speed of approximately 200 rpm.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides a method for production of high yield and high throughput nanoparticles using solvothermal method. In various embodiments, a solvothermal reactor is provided for enabling process conditions of a reactor in a manner so as to increase metal precursor loading up to solubility limit of a metal precursor solution. The disclosed method facilitates in high yield and high throughput nanoparticles produced.

The foregoing description of the specific implementations and embodiments will so fully reveal the general nature of the implementations and embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A method for production of nanoparticles using solvothermal synthesis process, comprising:
    determining a metal precursor loading based on a target production rate of the nanoparticles, target nanoparticle properties, and a plurality of solubility plots of a metal precursor solution, wherein the plurality of solubility plots are dependent on process conditions of a reaction for production of nanoparticles, and wherein the process conditions comprises temperature, pressure, pH, aging time and stirring speed of a reaction mixture during the reaction, and wherein the metal precursor loading is up to a solubility limit of the metal precursor loading, wherein the speed of stirring is defined in terms of turbulence, and wherein a scale of turbulence is characterized by a Kolmogorov scale of mixing defined as:

$$\eta = \left(\frac{v^3}{\varepsilon}\right)^{1/4},$$

where $v$ and $\varepsilon$ are kinematic viscosity and turbulence kinetic energy dissipation rate per unit mass;
    determining viscosity and density of the reaction mixture based on the process conditions and the metal precursor loading;
    estimating, based on the viscosity, the density of the reaction mixture and a mixing time, an optimal stirring speed to obtain target mixing characteristics for nanoparticle production, the mixing time indicative of time for stirring the reaction mixture;
    enabling the reaction by pouring a pH modifier drop wise into the metal precursor solution with stirring, resulting in formation of a metal hydroxide solution, wherein the concentration of the metal precursor solution maintained in a range of about 0.025 Molar to 2 Molar, pH in the range of 9 to 12, wherein the speed of stirring is the optimal stirring speed, and wherein the optimal stirring speed is in a range of about 800 to 1200 rpm; and
    heating the metal hydroxide solution and maintaining a temperature of the reaction in the range of 25° C. to 400° C. with aging time in the range of 6 to 24 hours to obtain nanoparticle slurry comprising the nanoparticles.

2. The method of claim 1, wherein the optimal stirring speed for a Rushton turbine impeller is obtained based on a relation between the mixing time and the stirring speed as a function of Reynolds number, wherein the relation is given as:

$$N_i t_m = \frac{1.54\, V}{D_i^3} \quad \text{for } Re_i > 5 \times 10^3$$

$$Re_i = \frac{N_i D_i^2 \rho}{\mu}$$

where, $N_i$ is the stirring speed, $t_m$ is mixing time, $Re_i$ is impeller Reynolds number, $\mu$ is the viscosity of the reaction mixture, $\rho$ is the density of the reaction mixture, and $D_i$ is diameter of the Rushton turbine impeller.

3. The method of claim 1, wherein the metal precursor solution consists of a cerium nitrate solution, the pH modifier consists of a sodium hydroxide solution, and the metal hydroxide solution consists of a cerium hydroxide solution.

4. The method of claim 3, further comprises preparing the cerium nitrate solution by adding cerium nitrate salt in double distilled water.

5. The method of claim 3, further comprises preparing the sodium hydroxide solution by adding sodium hydroxide salt in double distilled water.

6. The method of claim 1, wherein the solvothermal reactor comprises an autoclave reactor, an electrical heater, a rotor attached with a motor through a magnetic drive, and a control panel.

* * * * *